United States Patent
Rajan et al.

(10) Patent No.: US 9,825,952 B2
(45) Date of Patent: Nov. 21, 2017

(54) SECURE MACHINE TO MACHINE COMMUNICATION

(75) Inventors: Ashok Sunder Rajan, Burnaby (CA); Rakesh Dodeja, Portland, OR (US); David A. De Vries, Ottawa (CA); Hemaprabhu Jayanna, Folsom, CA (US); William J. Tiso, Hilton Head Island, SC (US); Kevin W. Bross, Tigard, OR (US); Robert J. Hunter, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 72 days.

(21) Appl. No.: 13/976,069

(22) PCT Filed: Dec. 30, 2011

(86) PCT No.: PCT/US2011/068010
§ 371 (c)(1),
(2), (4) Date: Jan. 29, 2014

(87) PCT Pub. No.: WO2013/101141
PCT Pub. Date: Jul. 4, 2013

(65) Prior Publication Data
US 2014/0143833 A1    May 22, 2014

(51) Int. Cl.
*G06F 7/04* (2006.01)
*H04L 29/06* (2006.01)
*H04W 4/00* (2009.01)

(52) U.S. Cl.
CPC .......... *H04L 63/10* (2013.01); *H04L 63/0876* (2013.01); *H04W 4/005* (2013.01); *H04L 63/123* (2013.01)

(58) Field of Classification Search
CPC .................................................. H04L 63/0478
(Continued)

(56) References Cited

U.S. PATENT DOCUMENTS

| 2004/0088536 A1* | 5/2004 | Lim .................... H04L 63/0428 713/151 |
| 2005/0050203 A1 | 3/2005 | Chattopadhyay et al. |

(Continued)

FOREIGN PATENT DOCUMENTS

| WO | 2006018680 | 2/2006 |
| WO | 2008116306 | 10/2008 |

OTHER PUBLICATIONS

Saedy et al., "Ad Hoc M2M communications and security based on 4G cellular system," 2011 Wireless Telecommunications Symposium (WTS) Year: 2011 pp. 1-5.*

(Continued)

*Primary Examiner* — Roderick Tolentino
(74) *Attorney, Agent, or Firm* — Trop, Pruner & Hu, P.C.

(57) ABSTRACT

An embodiment of the invention allows a network access server to control network access for individual applications that run on a device. The device may be included in a machine-to-machine environment. The embodiment may provide a secure channel between the network access server and the device access layer and another secure channel between the device access layer and the device application layer. Thus, before applications are allowed to access the network those applications may be required to authenticate themselves via a secure channel. Other embodiments are described herein.

14 Claims, 6 Drawing Sheets

(58) Field of Classification Search
USPC .............................. 713/150–154; 726/2–18
See application file for complete search history.

(56) References Cited

U.S. PATENT DOCUMENTS

| | | | |
|---|---|---|---|
| 2005/0193226 A1 | 9/2005 | Ahmed et al. | |
| 2009/0187757 A1* | 7/2009 | Kerschbaum | G06Q 10/10 713/153 |
| 2010/0162348 A1 | 6/2010 | Narayanan et al. | |
| 2010/0177900 A1* | 7/2010 | Hahn | H04L 9/12 380/277 |
| 2010/0205443 A1* | 8/2010 | Zhao | H04L 9/3218 713/171 |
| 2011/0258452 A1* | 10/2011 | Coulier | G06F 21/31 713/171 |
| 2012/0036364 A1* | 2/2012 | Yoneda | H04L 9/30 713/175 |
| 2012/0297473 A1* | 11/2012 | Case | H04L 63/0823 726/10 |
| 2013/0067083 A1* | 3/2013 | Rodbro | H04W 76/025 709/225 |
| 2014/0056229 A1* | 2/2014 | Li | H04W 8/186 370/329 |
| 2014/0325515 A1* | 10/2014 | Salmela | G06F 9/45533 718/1 |

OTHER PUBLICATIONS

Narasimmalou et al., "Security layers and reliable communications towards green computing," 2011 International Conference on Electronics, Communication and Computing Technologies Year: 2011 pp. 110-115.*

International Searching Authority, "Notification of Transmittal of the International Search Report and the Written Opinion of the International Searching Authority," dated Sep. 27, 2012, in International application No. PCT/US2011/068010.

European Patent Office, Extended European Search Report dated Oct. 7, 2015, In European Patent Application No. 11878452.

* cited by examiner

SECURE MACHINE TO MACHINE COMMUNICATION

BACKGROUND

Wired or wireless connections may be secured at the access layer of a device. Such devices are wide ranging and include, for example, mobile phones, personal digital assistants, billboards, vending machines, and the like. This security may require that the access layer on the device be authenticated to a Network Authentication Server (NAS), which is operated by a Network Access Provider (NAP). The NAP allows a network connection between the NAS and the device once the access layer has successfully been authenticated to the NAS.

To facilitate authenticating the access layer to the NAS, systems rely on a mature infrastructure for key agreement and management. This infrastructure allows the device to be shipped out from the manufacturer after authentication keys, which are tied to the device's identity, have been generated and located on the device (in the access layer) and on the NAS. Thus, an access layer authentication attempt will fail if the device attempts to access the network and the device's identity has been spoofed.

Although this infrastructure allows a NAP to control device access to the network, it does not control accessibility of the applications (that run on the device) to use the connection. For example, the infrastructure does not enable a NAP to allow some applications running on the device, but not all applications running on the device, to use the connection. For example, in the Machine to Machine (M2M) space a single accounting relationship may exist between a user (e.g., a soda distributor) and a Network Service Provider (NSP). Based on this relationship the soda distributor services hundreds of vending machines that access the NAP associated with the NSP. A compromise in device security at the user end (enterprise) therefore can have a system wide impact across all the devices.

For example, a single vending machine may be compromised by a single virus (e.g., Trojan virus). That single breach may allow the virus to take advantage of the M2M network and spread to all the vending machines. More specifically, an application on a single vending machine, such as software that drives a display on the vending machines, may be compromised and then spread to the other vending machines causing each machine to display an inappropriate message. As another example, the network connecting the machines could be debilitated based on virus related messaging consuming all available network bandwidth. Damage may even spread from the user's network to the external NSP infrastructure.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

An embodiment of the invention allows the NAP to control network connection access, on an application by application basis, for the applications that run on a device. The device may be included in a M2M environment. The embodiment may extend the mature key agreement and management infrastructure of the network (which is used to provide network connectivity via the access layer using keys deployed on the NAS and the device, as described in regard to FIG. 2) to operate with not only a secure channel between the NAS and the device access layer, but also with another secure channel between the device access layer and the device application layer. This "another secure channel" may be an extension of the NAS-Access layer channel to extend to the application layer. Thus, before applications are allowed network access those applications may be required to authenticate themselves to the NAS.

The secure channel may remove the need for a separate key agreement and management infrastructure independent of the access layer. Applications may gain network access based on authentication credentials that are provisioned into the device access layer through the established NSP infrastructure (described in regard to FIG. 2). These authentication credentials can be, for example, keys based on a hash of an application image, on certificates from a trusted Certificate Authority (CA), and the like. These authentication credentials are then used to (1) authenticate the application, (2) establish the secure channel (extending from the NAS to the access and application layers) based on successful application authentication, and (3) allow applications to retrieve permissions for running on the device through the established secure channel.

Figure 1:
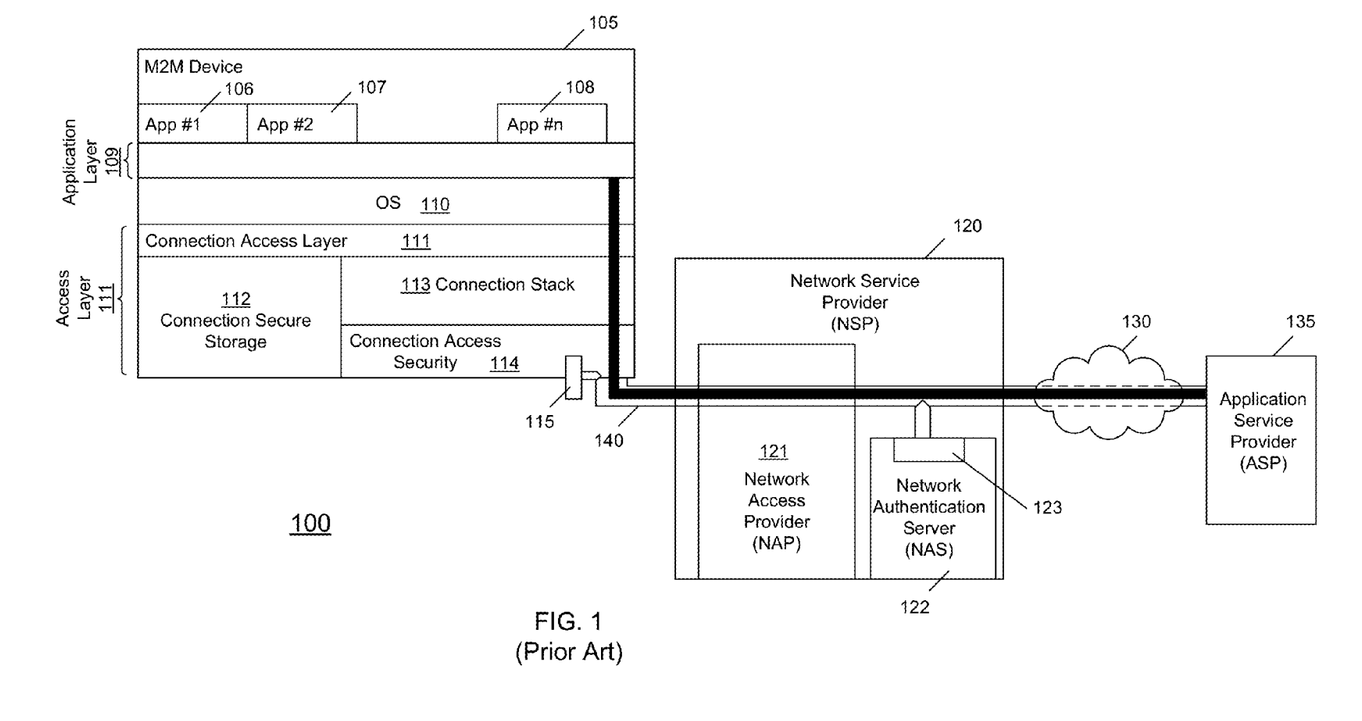
FIG. 1 includes a block diagram of a communication system in the prior art.
Figure 2:
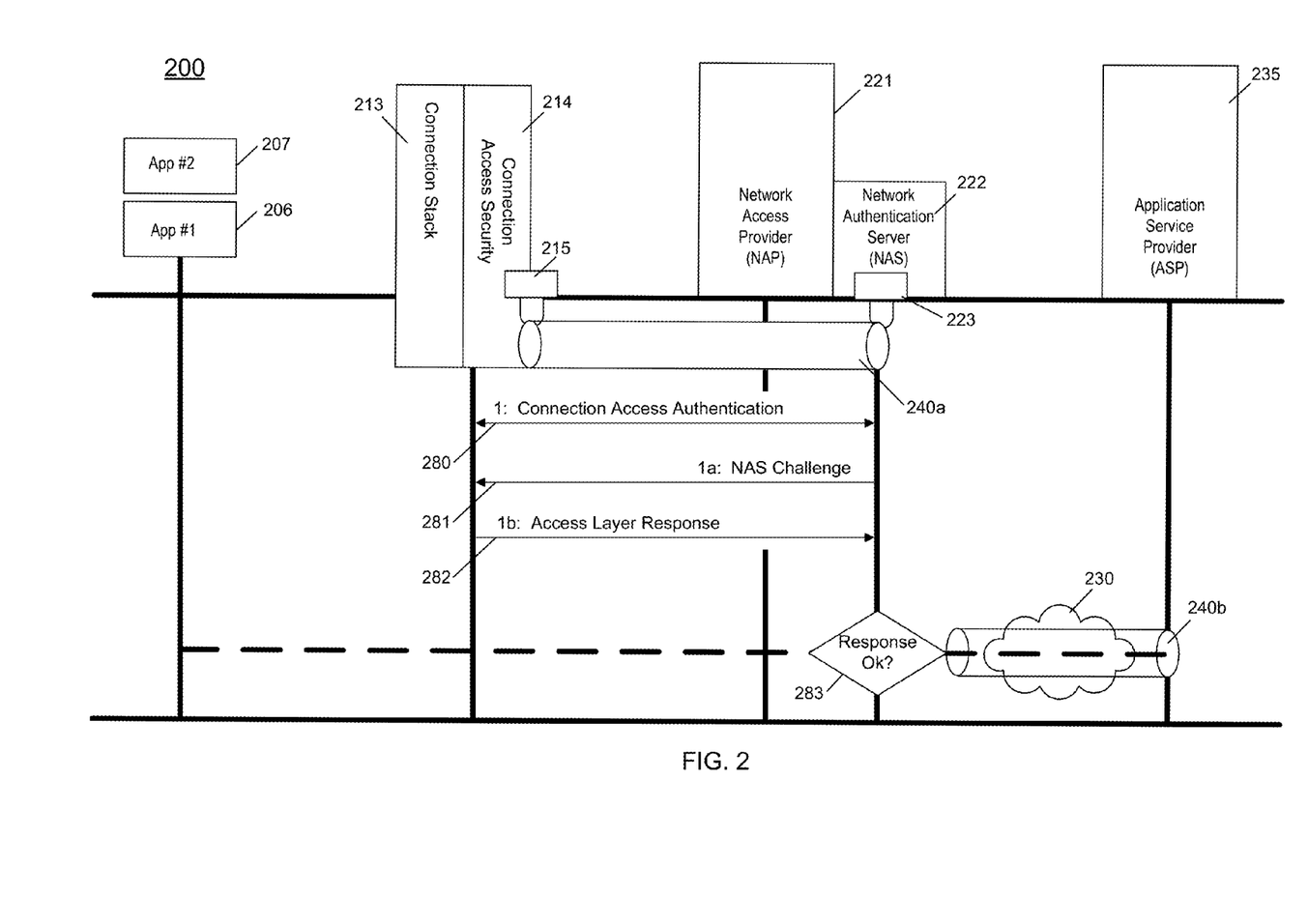
FIG. 2 includes a flow diagram of the communication system of FIG. 1.

FIG. 1 includes a block diagram of communication system 100 in the prior art. FIG. 2 includes a flow diagram for process 200 regarding the communication system of FIG. 1. Both figures, and the relationships between those figures, are discussed below.

The conventional system in FIG. 1 grants the device a network connection through the NSP and the device's access layer. This system allows any application on the device to access services on the cloud (over the connection established with the NSP) once the device access layer is authenticated.

For example, M2M device 105 communicates with application service provider 135 via NSP 120 and cloud 130. Device 105 may be one of many vending machines (purely used as an explanation and not meant to limit embodiments of the invention in any way) that are managed by NAS 120 and ASP 135. Device 105 may include several applications, such as "App #1" 106, which could be software for driving a display screen on the vending machine, "App #2" 107, which could be software for driving a change dispenser to provide change to a consumer purchasing items from the device, and "App #n" 108, which could be any of several other software modules concerning facial recognition, web cameras, audio modules, and the like. In this example, application 106 is not compromised by a virus but application 107 is compromised by a virus. Operating system 110 exists between application layer 109 and access layer 111.

FIG. 2 includes components similarly numbered to their counterparts in FIG. 1 (e.g., ASP 235 of FIG. 2 corresponds to ASP 135 of FIG. 1). Action 280 establishes connection authentication between NAS 222 and the connection access security module 214 located in connection stack 213. More specifically, in action 281 NAS 222 may issue a traditional challenge to module 214 by, for example, requiring a response (RES) to a random number (RAND). RES is computed using key 215 (e.g., stored in storage 112), which is symmetric to key 223 stored in NAS 222. In action 282 the computed RES is sent by module 214 to NAS 222. In action 283 NAS 222 computes the RES locally with key 223 and compares this with the RES from 214. If the RESs match, connections 240a and 240b (which may be secure or non-secure) may be established between the connection stack 213 and the Internet. However at this point once a connection has been established, any application (including both uncompromised application 206 and comprised application 207) may have network access to the Internet. No secure channel and application access control mechanism exists between access layer 111 and application layer 109 to police compromised applications from accessing the network and any ASP.

Figure 3:
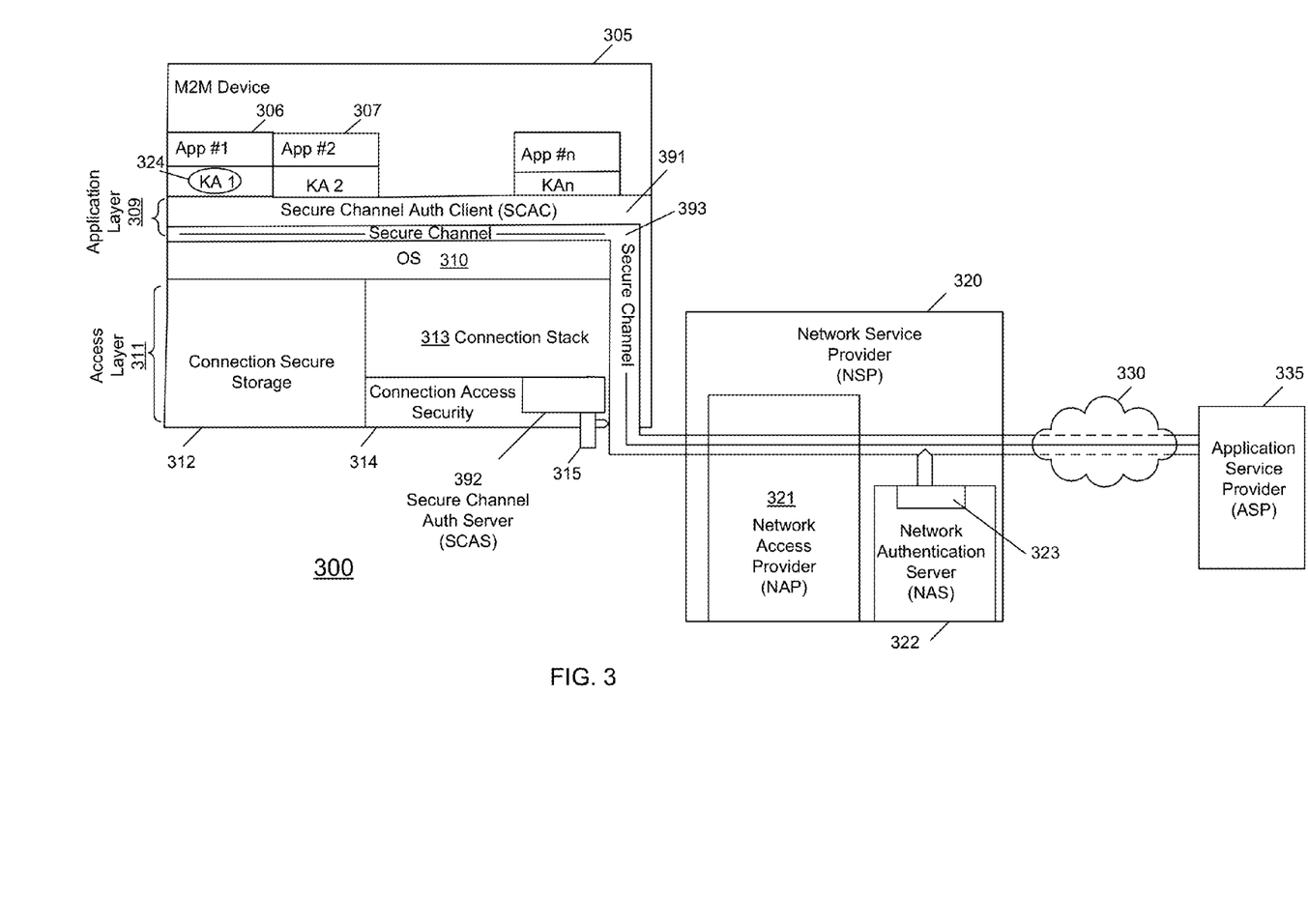
FIG. 3 includes a block diagram of a communication system in an embodiment of the invention.
Figure 4:
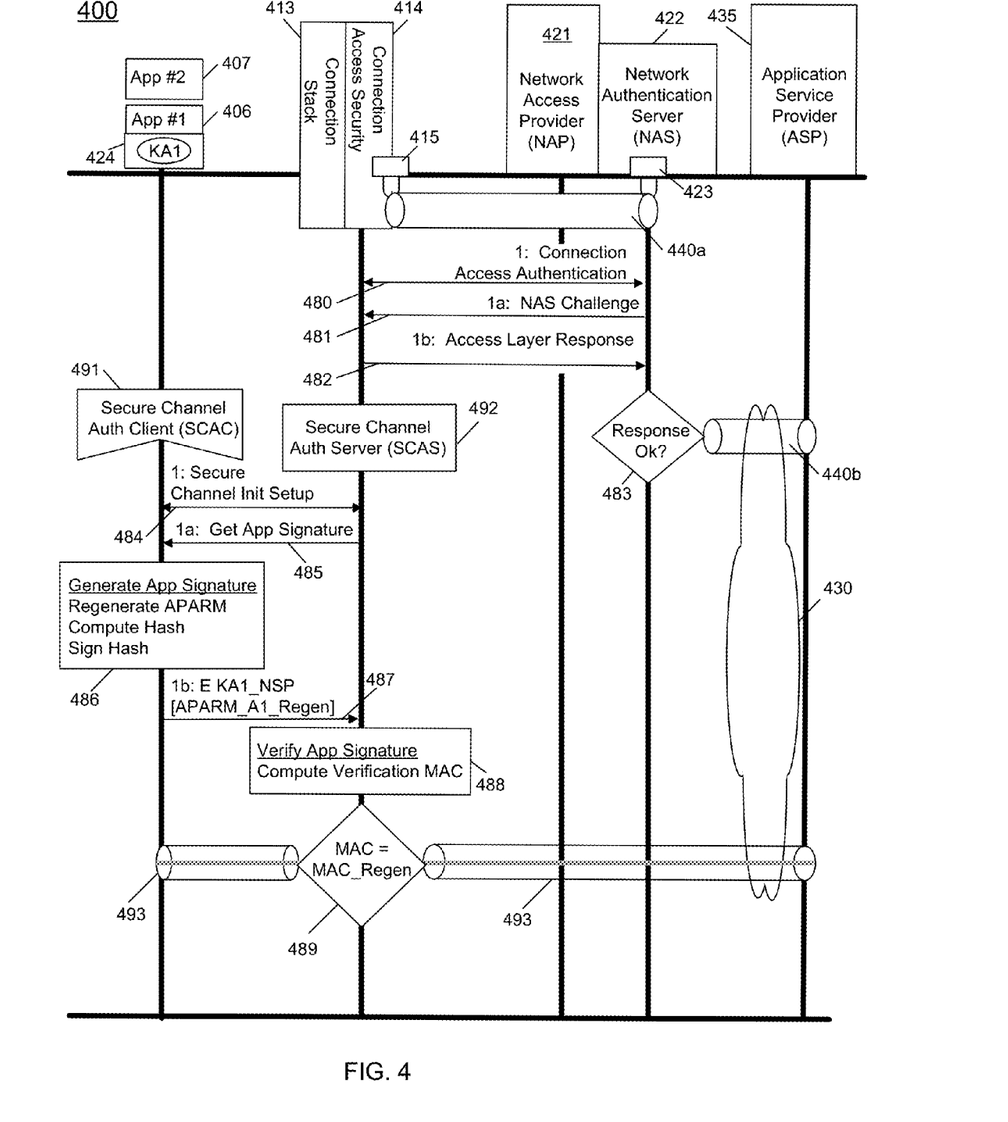
FIG. 4 includes a flow diagram of the communication system of FIG. 3.

FIG. 3 includes a block diagram of a communication system 300 in an embodiment of the invention. FIG. 4 includes a flow diagram for process 400 regarding the communication system of FIG. 3. Both figures, and the relationships between those figures, are discussed below.

FIG. 3 includes components similarly numbered to their counterparts in FIG. 1 (e.g., ASP 335 of FIG. 3 corresponds to ASP 135 of FIG. 1). However, FIG. 3 differs from FIG. 1 in several ways. For example, system 300 includes secure channel authorization client (SCAC) 391, secure channel authorization server (SCAS) 392, and secure channel 393 coupling access layer 311 to application layer 309. In one embodiment, SCAC 391 is implemented in the application layer of the device as an OS kernel extension that authenticates to SCAS 392, which is implemented in the access layer. In another embodiment, SCAS 392 may be implemented as an OS kernel module extension to a network access card driver, as part of the network access card itself, and the like. Further, the network access card may be implemented as network access hardware that is not a stand-alone card.

FIG. 4 includes components similarly numbered to their counterparts in FIG. 3 (e.g., ASP 435 of FIG. 4 corresponds to ASP 335 of FIG. 3). Actions 480, 481, 482 of FIG. 4 correspond to actions 280, 281, 282 of FIG. 2. However, in action 283 of FIG. 2 if the RESs match, connections 240a and 240b may be established using the symmetric keys 215, 223 and as a result, both uncompromised application 206 and compromised application 207 have access to NAS 22 and ASP 235 via connections 240a, 240b. This access for both application 206 (uncompromised) and application 207 (compromised) is prevented in the embodiment of FIG. 4.

An embodiment avoids the shortcomings of conventional systems (e.g., FIG. 2) while avoiding the need to modify applications 306, 307, 308 to accommodate the embodiment. The embodiment builds upon the mature NSP key agreement and management infrastructure (e.g., actions 480, 481, 482 using keys 415, 423). Instead of modifying applications 306, 307, 308, security benefits are obtained, based at least in part, on applications that are to be approved first having been registered with NSP 320 (e.g., images of the applications are registered with NSP).

In an embodiment, NSP 320 generates a NSP Application key for each application. Thus, the key for application 306 is referred to herein as KA1_NSP 324. KA1_NSP may be generated using various conventional methods such as, for example, using known and trusted application parameters (APARM). The known and trusted application parameters for application 306 are referred to herein as APARM_A1, where: APARM_A1=[AppA1_ID, AppA1_Hash, AppA1_Reg_Keys, . . . ]. "AppA1_ID" is an application identifier that identifies application 306. AppA1_ID may uniquely identify only application 306. However, in other embodiments AppA1_ID may generally identify application as a member of a family of approved applications (without necessarily indicating that member to be application 306). Regardless, AppA1_ID serves to set apart application 306 from, for example, application 307 (which in this example is assumed to have been compromised by a virus, thus altering its image). APARM_A1 may include other globally unique identifiers such as AppA1_Hash, which is a binary image checksum hash of application 306. APARM_A1 may also include AppA1_Reg_Keys, which are application specific OS registry keys. APARM_A1 may include other parameters and is not limited to those set out in the above example.

NSP 320 may thus generate KA1_NSP as follows: KA1_NSP=Fn{APARM_A1, RAND}; where RAND is a random number of sufficient size to ensure KA1_NSP uniqueness. NSP 320 may also generate a known application signature using KA1_NSP. For example, a hash of APARM_A1 may be created as follows: MACNSP_APPA1=HNSP (APARM_A1 [AppA1_ID, AppA1_Hash, AppA1_Reg_Keys, . . . ]); where HNSP is a known hashing algorithm (e.g., message digest (MD) 5) and MAC includes a message authentication code (MAC) for application 306. A MAC algorithm, sometimes called a keyed (cryptographic) hash function, accepts as input a key (e.g., KA1_NSP) and an arbitrary-length message to be authenticated (e.g., APARM_A1), and outputs a MAC (sometimes known as a tag). The MAC value protects both a message's data integrity as well as its authenticity, by allowing verifiers (who also possess the secret key) to detect any changes to the message content. Thus, the MAC is based on KA1_NSP and APARM_A1. The MAC constitutes a form of signature. Both KA1_NSP and MACNSP_APPA1 are then provisioned on SCAS 392 using established NSP provisioning mechanisms. This action is assumed to have already taken place in FIG. 4 during, for example, an earlier conducted initialization of application 306.

In this example, any application (whether approved or not) can be deployed on the device. Thus, both application 306 (approved) and application 307 (not approved due to virus attack) are both included in device 305. However, as explained below, the SCAC together with the SCAS (both running on the device) will ensure that only approved application 306 will have the permissions needed to access cloud 430 and enterprise services located on ASP 435. In an embodiment, any application will have to authenticate itself through the SCAC to the SCAS to establish secure channel 493. Only after successful authentication to the SCAS is secure channel 493 established. Application 306 can get the permission to access cloud and enterprise services after this establishment of the secure channel.

In an embodiment, SCAS 392 can be seen as a trusted NSP agent and SCAC 391 can be seen as a trusted device agent. In an embodiment one or both trusted agents may be implemented using Intel Active Management Technology®, which can embed network security credentials in hardware, via the Intel AMT Embedded Trust Agent® and an AMT posture plug-in. The plug-in collects security posture information, such as application 306 configuration (e.g., application 306 image) and security parameters from NSP 320. The plug-in and trust agents can store the security profile(s) in AMT's protected, nonvolatile memory, which is not on the hard disk drive. Such protected memory may be included in, for example, a Trusted Platform Module (TPM) or a universal integrated circuit card such as, for example, Connection Secure Storage 312. A TPM is a secure cryptoprocessor that can store cryptographic keys. Because AMT has an out-of-band communication channel, AMT can present device 305's security posture to the network even if the device's OS or security software is compromised.

Returning to FIG. 4 and after actions 480, 481, 482 have generated secure channel 44a, in action 484 SCAC 491 begins secure channel initialization between the access and application layers. In action 485, SCAC 491 will generate an application signature (e.g., a MAC) based on the present state of application 406. The signature generation process is detailed in action block 486 with SCAC 491 regenerating application parameters as follows: APARM_A1_Regen= [AppA1_ID_Regen, AppA1_Hash_Regen, AppA1_Reg_Keys_Regen, . . . ]. Thus, SCAC 491 rebuilds or regenerates application parameters independent of the APARMs that were provisioned to the SCAS when the application (e.g., application 406) was registered on device 305 (i.e., APARM_A1). This allows any application, approved or otherwise, to be signed off for permissions on the device.

With the newly regenerated APARM_A1_Regen at hand, SCAC 491 may compute a new MAC as follows: MAC_Regen=H(APARM_A1_Regen [AppA1_ID_Regen, AppA1_Hash_Regen, AppA1_Reg_Keys_Regen, . . . ]). MAC_Regen may be based on APARM_A1_Regen and KA1_NSP (which was provided earlier, such as when application 406 was installed on device 305) as follows: MAC_Regen=E KA1_NSP [APARM_A1_Regen]).

As indicated in action 487 and block 488, SCAS 492 verifies the signature or MAC calculated in block 486. In an embodiment, with SCAS 492 having already been provisioned with both KA1_NSP and MACNSP_APPA1 (see above), verification of the SCAS signature is performed. SCAS 492 computes a verification as follows: MAC=D KA1_NSP (E (MACNSP_APPA1)).

In block 489, SCAS 492 determines if MAC=MAC_Regen where MACNSP_APPA1 was provisioned from NSP 420 to device 405 and MAC_Regen was regenerated by SCAC 491. If MAC=MAC_Regen then SCAS 492 determines the application authentication efforts a success and secure channel 493 can be established. Channel 493 may couple to channel 440a to create a channel extending from the application layer to the cloud and ASP 435. Thus, application 406 can access cloud 430 and enterprise services via ASP 435 after secure channel 493 is established. However, any MAC for compromised application 407 would not satisfy block 489, and thus compromised application 407 would not gain access to cloud 430 or ASP 435.

Thus, in an embodiment the SCAS is the trusted agent of the NSP while the SCAC acts as the local application signing authority on the device. The SCAC initiates a secure channel with the SCAS to establish a secure channel between the application layer and the access layer. For successful establishment of this secure channel the signature (e.g., MAC_Regen) generated by the SCAC (the local application signing authority) is shown to match the signature (e.g., MAC, which is based on MACNSP_APPA1 provisioned from the NSP to the SCAS) held by the SCAS. Encrypted signatures, such as MACs, help protect against main in the middle attacks (MITM) and the like.

In another embodiment, a certificate authority (CA) may be used to sign applications, such as application 406. In this case, only the application certificate (CAn) needs to be provisioned to SCAS 492 (instead of provisioning KA1_NSP and MACNSP_APPA1 as discussed above). In an embodiment, CAn=KUAn‖EKrCA [H [APARM_A1]]; where KUAn is the application public key issued by the CA and where EKrCA [H [APARM_A1]] is the APARM_A1 signed by the CA.

In such an embodiment, SCAC 491 computes or generates the MAC based on the present implementation of application 406. The regeneration for the MAC can occur as described above in regards to block 486. However, in contrast with block 488, in this embodiment the newly generated MAC can be verified by SCAS 492 against the signature of the application in the provisioned application certificate CAn. As explained above, CAn=KUAn‖EKrCA [H [APARM_A1]](i.e., EKrCA [H [APARM_A1] is the APARM_A1 signed by the CA). Thus, SCAS 492 can decrypt EKrCA [H [APARM_A1]] with KUAn and then compare APARM_A1 with the newly derived application 406 parameters. If there is a match then channel 493 may be established.

Thus, in one embodiment a series of secure channels are established. A first channel extends from NSP 320 to the device access layer 311. Another channel couples application layer 304 to access layer 311 to. These channels may be thought of as two channels, multiple channels (simultaneously or non-simultaneously formed) that form a single channel, the point being that one or more secure channels can be used to couple an approved application to cloud 330 and to prohibit a non-approved application from accessing the cloud. Thus, embodiments may use a first authentication sequence to first build a channel between the access layer and NAS and then use a second authentication sequence to build a channel from the application layer to the access layer. Another embodiment may use a single authentication sequence to authenticate an application all the way from the application layer to the NSP. Again, the point being that a secure channel (comprised of one or more channels) couples an application to the cloud and/or ASP. The secure channel or channels may be used to communicate a message (e.g., content to be displayed on a vending machine display monitor) between the NSP node and the approved application. This authentication may be based on application authentication credentials such as those found in application parameters delivered to the device from the NSP and/or application parameters (e.g., application image) regenerated from the application's present state on the device at the time of authentication.

Further, embodiments provide a scalable implementation of the SCAC and the SCAS on devices so applications can be approved or blocked from accessing cloud 430 and ASP 435. Scalability is due, in part, to the reliance on the established NSP key agreement and provisioning infrastructures (e.g., FIG. 2). Embodiments also provide security features based on, for example, the independent rebuilding of the application parameters by a module (e.g., SCAC) allowing any application to be installed on the device but permitting only approved applications to access network services. Security features are fostered by the SCAS acting as a trusted NSP agent and/or with the SCAC acting as a trusted device agent. This allows, for example, the SCAC to become the application signing authority for the initiation of a secure channel to enable application services. Security is further provided in some embodiments by providing a security channel between a universal integrated circuit card (e.g., Connection Secure Storage 312, which holds applications) and the OS Kernel.

Figure 5:
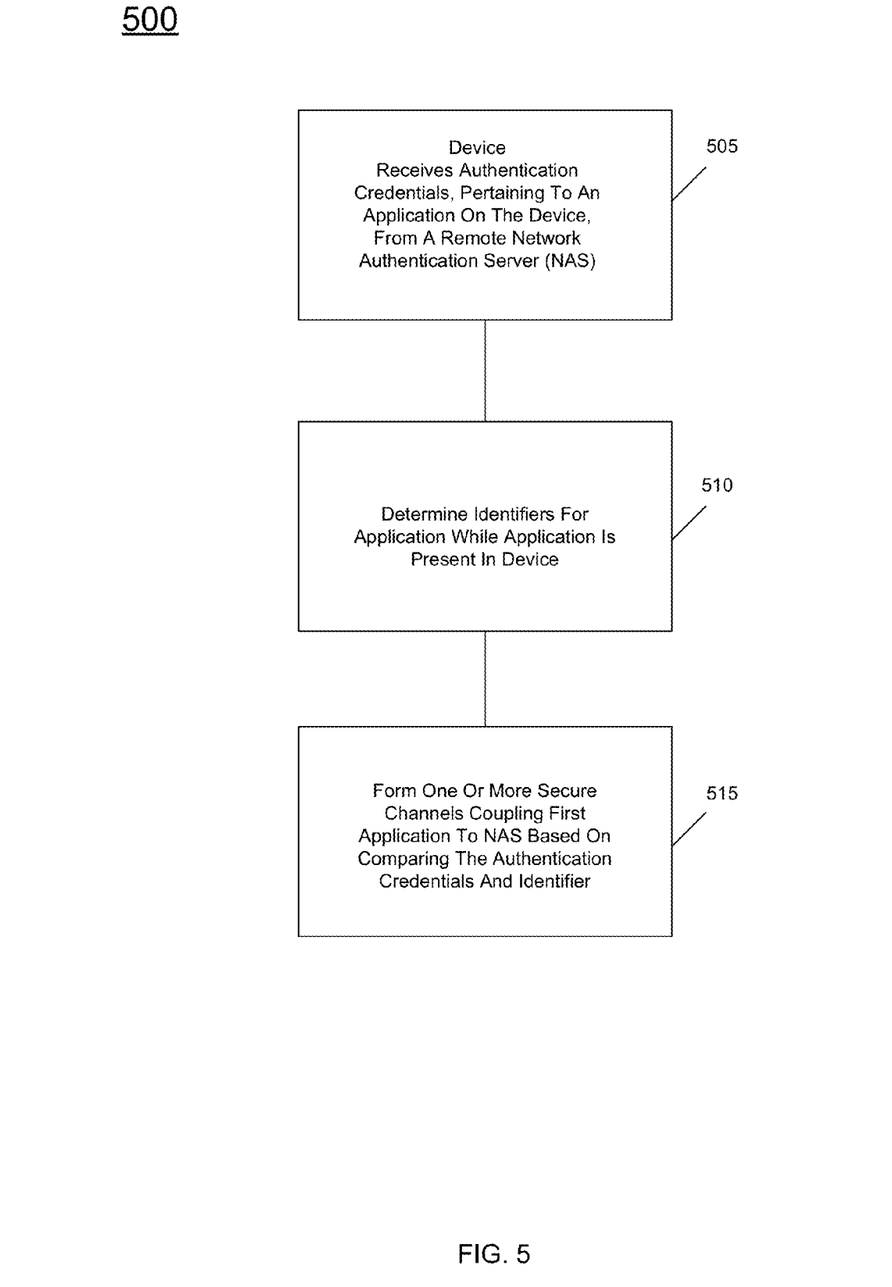
FIG. 5 includes a flow diagram for secure M2M communication in an embodiment of the invention.

FIG. 5 includes a flow diagram for secure M2M communication in an embodiment of the invention. In block 505 a device receives authentication credentials for an application (e.g., hashed image of the application) from a NAS. In block 510 the device determines an identifier for the first application (e.g., a hashed image of the application that is determined while the application is resident in the device). In block 515 one or more channels (e.g., independent channels or independent channels that collectively form a single channel) are formed to couple the application to the NAS based on authenticating the application (included in an application layer) to an access layer based on both of the authentication credentials and the identifier (e.g., comparing hashed image of the application (received from NSA) with a hashed image determined by the device while the application is resident in the device).

While embodiments discuss specific authentication codes such as MACs, other embodiments are not so limited to any one form of authentication code. Further, while FIG. 4 illustrates secure channels in disparate drawings and the like, various embodiments provide that a channel, established at once or over time using disparate parts, may couple an application in an application layer all the way to the NSP, cloud, ASP, and the like.

Figure 6:
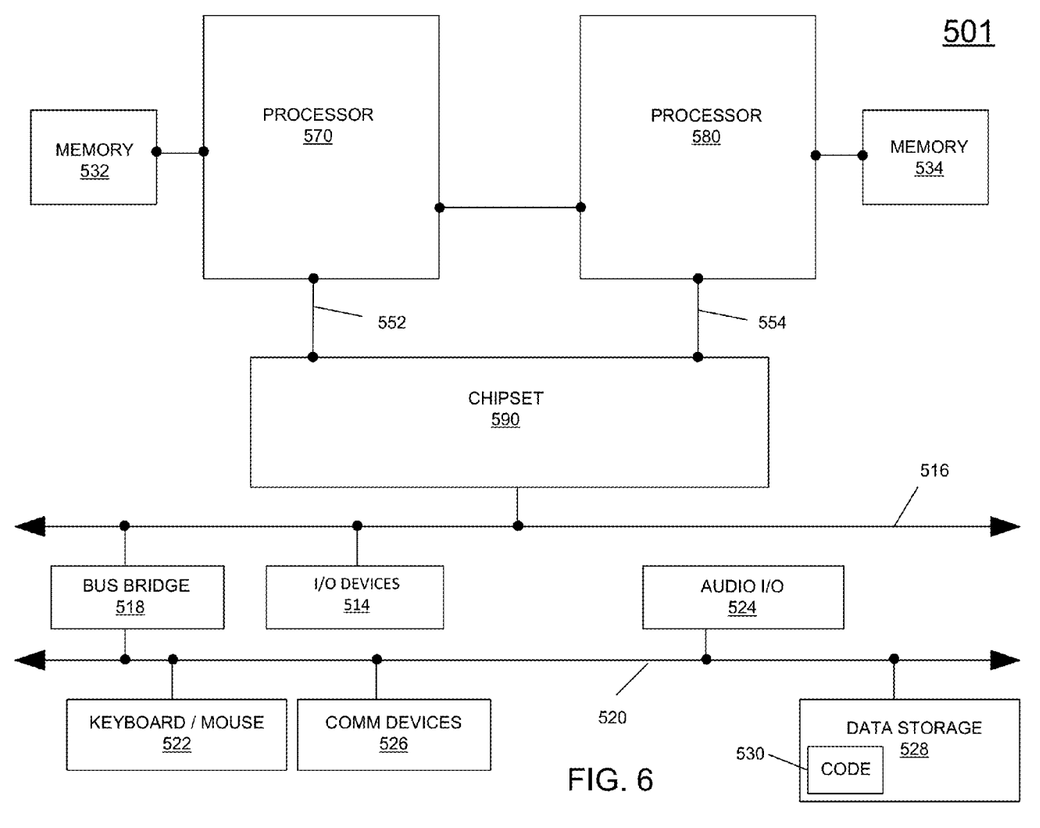
FIG. 6 includes a schematic for a system to be used in an embodiment of the invention.

Embodiments may be implemented in many different system types. Referring now to FIG. 6, shown is a block diagram of a system in accordance with an embodiment of the present invention. Multiprocessor system 501 is a point-to-point interconnect system, and includes a first processor 570 and a second processor 580 coupled via a point-to-point interconnect 550. Each of processors 570 and 580 may be multicore processors. The term "processor" may refer to any device or portion of a device that processes electronic data from registers and/or memory to transform that electronic data into other electronic data that may be stored in registers and/or memory. First processor 570 may include a memory controller hub (MCH) and point-to-point (P-P) interfaces. Similarly, second processor 580 may include a MCH and P-P interfaces. The MCHs may couple the processors to respective memories, namely memory 532 and memory 534, which may be portions of main memory (e.g., a dynamic random access memory (DRAM)) locally attached to the respective processors. First processor 570 and second processor 580 may be coupled to a chipset 590 via P-P interconnects, respectively. Chipset 590 may include P-P interfaces. Furthermore, chipset 590 may be coupled to a first bus 516 via an interface. Various input/output (I/O) devices 514 may be coupled to first bus 516, along with a bus bridge 518, which couples first bus 516 to a second bus 520. Various devices may be coupled to second bus 520 including, for example, a keyboard/mouse 522, communication devices 526, and data storage unit 528 such as a disk drive or other mass storage device, which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. Components or modules may be combined or separated as desired, and may be positioned in one or more portions of a device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first device including an access layer, an application layer, at least one processor, and at least one non-transitory machine accessible medium having instructions stored thereon, the instructions when executed on the at least one processor cause the at least one processor to:
   establish a first secure channel between the access layer and a network service provider (NSP) node; wherein the application layer includes a first application and a second application, and the NSP node is located remotely from the first device;

signing a message authentication code (MAC) using a trusted agent that corresponds to the first device node and is included in the application layer, wherein the MAC is based on a first identifier that uniquely corresponds to the first application and not to the second application;

establish a second secure channel between the application layer and the access layer in response to a trusted agent for the NSP node, which is included in the access layer, authenticating the signed MAC and communicate a message, between the NSP node and the first application, via a serial communication that traverses both of the first and second secure channels.

2. The apparatus of claim 1 further comprising instructions that when executed on the at least one processor cause the at least one processor to reject authentication of the second application to the access layer based on second application authentication credentials corresponding to the second application.

3. The apparatus of claim 2 further comprising instructions that when executed on the at least one processor cause the at least one processor to authenticate the access layer to the NSP node based on first device authentication credentials corresponding to the access layer, wherein the first device authentication credentials are unequal to both first application authentication credentials and the second application authentication credentials.

4. The apparatus of claim 1 further comprising instructions that when executed on the at least one processor cause the at least one processor to authenticate the first application to the access layer based on an operating system kernel extension included in the application layer communicating with the trusted agent for the NSP node.

5. The apparatus of claim 1 further comprising instructions that when executed on the at least one processor cause the at least one processor to receive first application authentication credentials from the NSP node, the first application authentication credentials being based on the first identifier.

6. The apparatus of claim 1 further comprising instructions that when executed on the at least one processor cause:
the first device to receive a certificate from a third party, the certificate being based on the first identifier;
the trusted agent for the first device to determine an authentication code based on the first application; and
the first device to authenticate the authentication code based on the certificate and establish the second secure channel based on authenticating the authentication code.

7. The apparatus of claim 1 further comprising:
instructions that when executed on the at least one processor cause the trusted agent for the first device to determine an authentication code based on the first identifier and sign the authentication code based on a first key that is based on the first identifier.

8. At least one non-transitory storage medium having instructions stored thereon for causing system to perform a method comprising:
establishing a first secure channel between an access layer and a network service provider (NSP) node; wherein a first device node includes the access layer and an application layer, the application layer includes a first application and a second application, and the NSP node is located remotely from the first device node;
a trusted agent for the first device node, which is included in the application layer, determining and signing a message authentication code (MAC) based on a first identifier that uniquely corresponds to the first application and not to the second application;
establishing a second secure channel between the application layer and the access layer in response to a trusted agent for the NSP node, which is included in the access layer, authenticating the signed MAC; and
successfully communicating a message, between the NSP node and the first application, via a serial communication that traverses one of the first and second secure channels and then another of the first and second secure channels.

9. The at least one medium of claim 8, the method comprising rejecting authentication of the second application to the access layer based on second application authentication credentials corresponding to the second application.

10. The at least one medium of claim 9, the method comprising authenticating the access layer to the NSP node based on first device authentication credentials corresponding to the access layer, wherein the first device authentication credentials are unequal to the second application authentication credentials.

11. The at least one medium of claim 8, the method comprising authenticating the first application to the access layer based on an operating system kernel extension included in the application layer communicating with the trusted agent for the NSP node; wherein the first and second channels collectively comprise a single channel.

12. The at least one medium of claim 8, the method comprising provisioning the first device node with first application authentication credentials delivered from the NSP node to the first device node, the first application authentication credentials being based on the first identifier.

13. At least one non-transitory storage medium having instructions stored thereon for causing system to perform a method comprising:
establishing a first secure channel between an access layer and a network service provider (NSP) node; wherein a first device node includes the access layer and an application layer, the application layer includes a first application and a second application, and the NSP node is located remotely from the first device node;
the first device node receiving a certificate from a third party, the certificate being based on a first identifier that uniquely corresponds to the first application and not to the second application;
a trusted agent for the first device node, which is included in the application layer, determining an authentication code based on the first application;
authenticating the authentication code based on the certificate;
establishing a second secure channel between the application layer and the access based on authenticating the authentication code; and
successfully communicating a message, between the NSP node and the first application, via a serial communication that traverses one of the first and second secure channels and then another of the first and second secure channels.

14. The at least one medium of claim 13, the method comprising rejecting authentication of the second application to the access layer based on second application authentication credentials corresponding to the second application.

* * * * *